Figure 9:
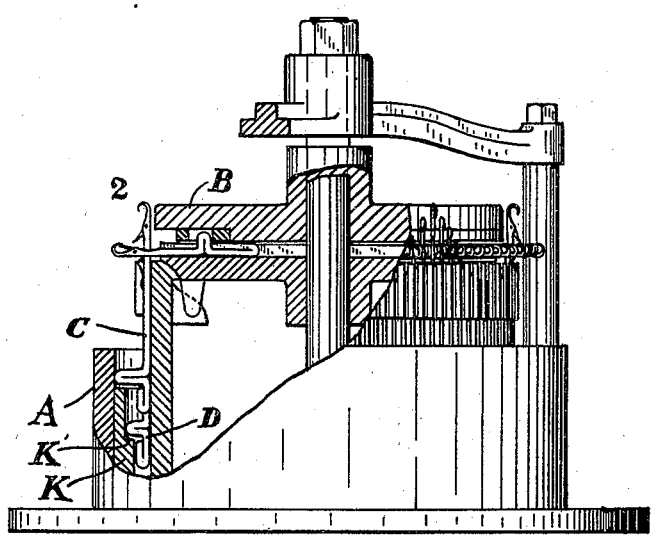

No. 649,243. Patented May 8, 1900.
T. HENRY.
CIRCULAR RIB KNITTING MACHINE.
(Application filed Nov. 15, 1899.)
(No Model.) 2 Sheets—Sheet 1.
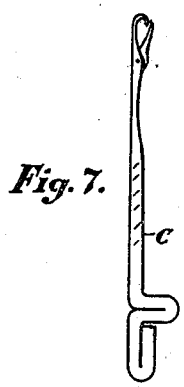
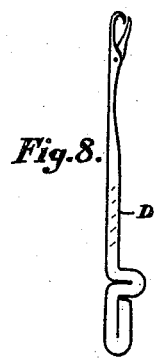
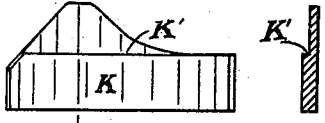
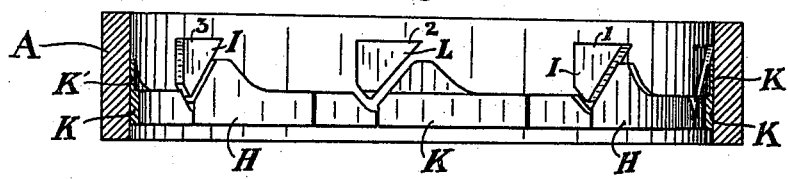
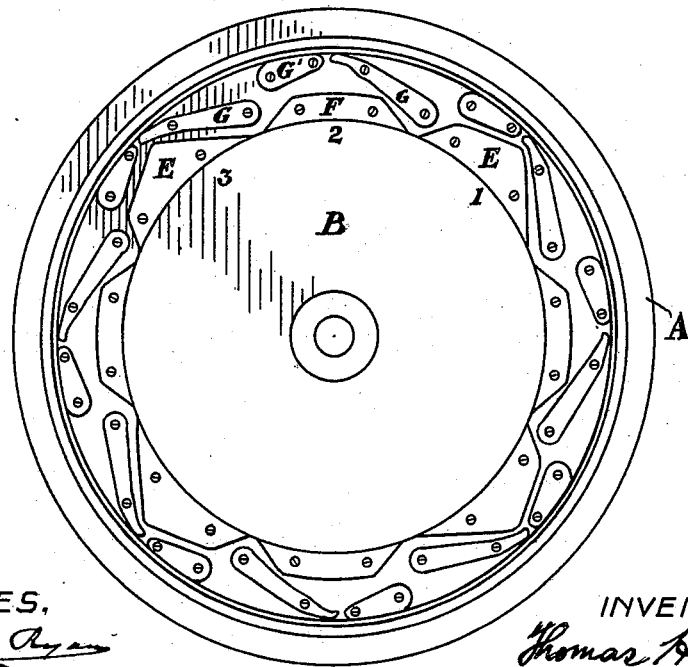
WITNESSES,
INVENTOR,
Thomas Henry
ATTORNEY.

No. 649,243. Patented May 8, 1900.
T. HENRY.
CIRCULAR RIB KNITTING MACHINE.
(Application filed Nov. 15, 1899.)
(No Model.) 2 Sheets—Sheet 2.

WITNESSES:
Thomas L. Ryan
H. Thurman

INVENTOR,
Thomas Henry
by Wm DuVal Brown
ATTORNEY.

UNITED STATES PATENT OFFICE.

THOMAS HENRY, OF MUNCIE, INDIANA.

CIRCULAR-RIB-KNITTING MACHINE.

SPECIFICATION forming part of Letters Patent No. 649,243, dated May 8, 1900.

Application filed November 15, 1899. Serial No. 737,031. (No model.)

*To all whom it may concern:*

Be it known that I, THOMAS HENRY, a citizen of the United States, residing at Muncie, in the county of Delaware and State of Indiana, have invented a new and useful Improvement in Circular-Rib-Knitting Machines, of which the following is a specification.

The aim and purpose of my invention is to construct a circular-rib-knitting machine which will make vertical stripes of two or more colors on the face of the material.

In the drawings I have shown sufficient parts of a circular-rib-knitting machine to illustrate my invention. I also show my improvement on a machine wherein the cam-ring for the cylinder and the cam-dial for the dial are stationary and the cylinder and dial revolve. While I have shown such a machine, it is obvious that I could apply my improvement to machines with other mechanisms—such, for instance, those with stationary cylinder and dial and revolving cam-rings and cam-dials.

Like letters and figures of reference indicate corresponding parts in the several views.

Figure 11:
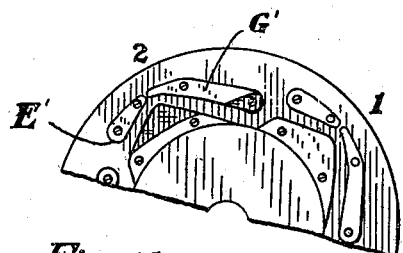
Figure 12:
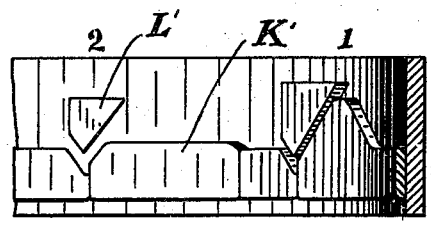
Figure 10:
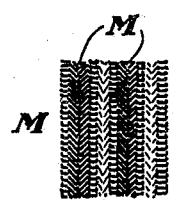

Figure 1 is a bottom plan view of the cam dial-plate with the cylinder cam-ring surrounding the same. Fig. 2 is a vertical central section through the cylinder cam-ring. Fig. 3 is a top plan view of the split rising cam in the cam-ring. Fig. 4 is a side elevation of the same. Fig. 5 is a section on the line 5 5, Fig. 4. Fig. 6 is a cross-section through the stitch-cam. Figs. 7 and 8 are detail enlarged views of the normal and short-butt needles, respectively. Fig. 9 is a view, partly in section, showing the parts assembled. Fig. 10 is a view showing the fabric manufactured with my improvement. Fig. 11 is a detail view of a portion of the dial-plate, showing a modification of the arrangement of the cams, wherein the double rising and stitch cams are on the dial instead of on the cylinder; and Fig. 12 is a detail view of a portion of the cylinder, showing the normal and float cam thereon instead of the double and normal cam shown in Fig. 2, carrying out the modification shown in Fig. 11.

In the drawings, A designates the cam-ring, and B the cam dial-plate. The cylinder (not shown) carries the normal needles C, Fig. 7, and the short-butt needles D, Fig. 8. The needle D is not only provided with a shorter butt than the normal needle, but is also a fraction of an inch shorter, for a purpose hereinafter described.

By referring to Fig. 1 it will be seen that I provide a dial-plate for an eight-feed machine, although it is evident that the feed could be varied at pleasure. At the feed marked 1 the dial-plate is provided with a normal pushing-out cam E instead of the float-cam F shown at feed 2. These float and normal cams alternate around the dial-plate. The plate is provided with the ordinary stitch and blank cams G G'. The cam-ring at feed 1 is provided with a normal rising cam H and a normal stitch-cam I. I mean by the word "normal" cam a cam which is used in the ordinary circular-rib-knitting machine. The cam-ring at feed 2 is provided with a double or split rising cam K and a double or split stitch-cam L. The split or double rising cam K is plainly shown in Figs. 3, 4, 5, and 9. This cam has its upper inner face cut away, forming the horizontal shoulder K'. In the operation of the machine the short-butt needle D will not rise up over this cam, but will float and pass along this horizontal shoulder K', as plainly shown in Fig. 9. The stitch-cam L has its lower face cut away, forming the horizontal shoulder L', as shown in Fig. 6. The shoulders on the two cams are arranged on the same horizontal plane, as shown in Fig. 2, and the short-butt needle after riding along the shoulder K' will also ride under the shoulder L', and will not pass under the stitch-cam with the long-butt needles or rise with them.

In carrying out my invention the parts are assembled in the usual way, and the cylinder equipped with the normal and short-butt needles C and D, while the dial is equipped with only the ordinary needles.

The operation of the machine is as follows: The cams on both the dial-plate and cylinder-ring are normal at feed 1, and a white thread is taken at this feed. As these cams are all normal both the long and short butt needles will rise and take the thread. The short-butt needle being also shorter in length will take a much longer stitch at the stitch-cam than the long-butt needle; otherwise it would make a tight stitch or wale, as the short-butt needle only takes the thread at every other feed, as hereinafter described. The dial-needles take the white thread at feed 1, and at feed 2 the dial-plate is provided with the float-cams F, allowing the dial-needles to retain the thread taken at this feed and cast off at the next feed 3, which is provided with the normal cams similar to feed 1. The rising cam on the cylinder-ring at feed 2, however, is a double cam K, which allows the short-butt needles to float along the shoulder K' under the said feed and, therefore, they do not take any thread at this feed. The stitch-cam at this feed is also a double or split cam so that the short-butt needles will not be actuated at this cam. At feed 2 a brown thread is fed, and the long-butt needles will take their regular course, rising and taking this brown thread and casting off at the stitch-cam at this feed. As there is a float-cam in dial-plate at feed 2, as before described, the dial-needles will retain their thread, allowing the long-butt needles in the cylinder-ring to draw much more extra thread than at carrier 1, therefore in casting off it covers the stitch or wale on face of the webbing, showing the colored thread on the face of the webbing at the long-butt needles and throwing the white to the back of the webbing or, in other words, forming a tuck-stitch at the long-butt needles. As before described, the short-butt needles not taking any yarn at feed 2, only taking the yarn at feeds 1 and 3, or at every other feed, will only show the thread which they take at these feeds on the face of the webbing at the said feeds. The dial-needles at feed 3 will also cast off the thread taken at feed 1, and the thread taken at feed 2, therefore throwing the white to the back and the color on the face. The operation of the needles at feed 2 is plainly shown in Fig. 9.

Referring to Fig. 10, M designates the fabric, showing the colored tuck-stitch M' and the single white stitch M''. While I have shown the fabric with every other stitch white to correspond with the arrangement of the cams in the cylinder, I do not desire to limit myself to this design, as it is obvious that by simply changing the arrangements of the cams in the cylinder the style or design of the fabric will be changed; nor do I desire to limit myself to a white and brown combination, as I can change the color of the threads at will without departing from my invention.

In Figs. 11 and 12 I show a modification of my invention, placing the split or double rising and stitch cams E' and G', respectively, at feed 2 on the dial-plate, and at feed 2 on the cylinder-ring the normal and float cams L' and K', respectively. At feed 1 I show all the cams on both the cylinder-ring and dial-plate normal. In this modification the operation is just reversed, throwing the design on the back of the webbing or fabric instead of on the front, as before described.

I am aware that many minor changes can be made in the arrangement of parts and construction without in the least departing from the nature and principles of my invention.

Having thus described my invention, what I claim as new, and desire to secure by Letters Patent, is—

1. In a knitting-machine, the combination with the needle-dial and the needle-cylinder, of cam-carriers therefor, a double rising cam and a complementary double stitch-cam on one carrier with two sets of needles coöperating therewith, one set having longer butts than the other set, and a complementary float-cam on the other cam-carrier.

2. In a knitting-machine, the combination with the needle-dial and the needle-cylinder, of cam-carriers therefor, a double rising cam and a complementary double stitch-cam on one carrier with two sets of needles coöperating therewith, one set having longer butts than the other set, the short-butt needles being shorter in length than the long-butt needles, and a complementary float-cam on the other cam-carrier.

3. In a knitting-machine, the combination with the needle-dial and the needle-cylinder, of cam-carriers therefor, a normal rising and normal stitch cam on one carrier and a complementary normal rising and normal stitch cam on the other carrier, a double rising and double stitch cam on one carrier and a complementary float-cam on the other carrier, long and short butt needles, the short-butt needles being shorter in length than the long-butt needles, the said needles coöperating with the carrier having the double cams, and a set of normal needles coöperating with the other carrier.

In testimony whereof I have hereunto set my hand in the presence of two witnesses.

THOMAS HENRY.

Witnesses:
C. C. PAVEY,
WM. DU VAL BROWN.